United States Patent
Abellan

(10) Patent No.: US 11,774,633 B2
(45) Date of Patent: Oct. 3, 2023

(54) METHOD TO AUTOMATICALLY CALIBRATE A DOWNHOLE TOOL IN AN OIL-BASED MUD ENVIRONMENT

(71) Applicant: Schlumberger Technology Corporation, Sugar Land, TX (US)

(72) Inventor: Alexandre Abellan, Clamart (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 1308 days.

(21) Appl. No.: 16/000,301

(22) Filed: Jun. 5, 2018

(65) Prior Publication Data

US 2019/0369288 A1   Dec. 5, 2019

(51) Int. Cl.
  *G01V 13/00*   (2006.01)
  *E21B 49/08*   (2006.01)
  *G01V 3/26*    (2006.01)

(52) U.S. Cl.
  CPC .............. *G01V 13/00* (2013.01); *E21B 49/08* (2013.01); *G01V 3/26* (2013.01); *E21B 49/0875* (2020.05)

(58) Field of Classification Search
  CPC .......... G01V 13/00; G01V 3/26; E21B 49/08; E21B 49/0875
  See application file for complete search history.

(56) References Cited

U.S. PATENT DOCUMENTS

| | | | | |
|---|---|---|---|---|
| 3,443,221 A | * | 5/1969 | McGill | G01R 1/203 324/706 |
| 7,183,771 B2 | * | 2/2007 | Flanagan | G01V 3/30 324/338 |
| 7,225,662 B2 | * | 6/2007 | Kamata | G01V 13/00 367/13 |

(Continued)

FOREIGN PATENT DOCUMENTS

WO    WO2016082925 A1    6/2016

OTHER PUBLICATIONS

Search and Examination Report issued in European patent application 19178259.8 dated Oct. 16, 2019, 7 pages.

*Primary Examiner* — Kibrom K Gebresilassie
(74) *Attorney, Agent, or Firm* — Jeffrey D. Frantz

(57) ABSTRACT

A method and apparatus to calibrate a resistivity measurement taken by a downhole tool in a borehole, wherein the downhole tool estimates the resistivity of an underground formation penetrated by the borehole with at least one sensor situated at a non-zero standoff distance from the borehole, is provided. The method includes taking apparent impedance measurements with the sensor at a set of frequencies and at a first plurality of locations in the borehole, wherein the measurement are uncalibrated measurements. The method also includes identifying a portion of the borehole in which the apparent impedance measurements at least at a first frequency of the set have a predetermined behavior. The predetermined behavior is that the apparent impedance measurements taken in the portion are substantially fitting a (Continued)

linear model when represented in the complex plane. The method also includes using a plurality of measurements obtained at a second plurality of location situated in said portion at the first frequency to determine calibration coefficients for the measurements at said frequency.

15 Claims, 7 Drawing Sheets

(56) References Cited

U.S. PATENT DOCUMENTS

| | | | |
|---|---|---|---|
| 8,633,701 B2* | 1/2014 | Itskovich | G01V 3/24 324/366 |
| 2005/0088180 A1* | 4/2005 | Flanagan | G01V 13/00 324/338 |
| 2010/0154531 A1* | 6/2010 | Han | E21B 47/085 73/152.47 |
| 2012/0078558 A1* | 3/2012 | Pelegri | G01V 13/00 702/85 |
| 2013/0030708 A1 | 1/2013 | Forgang et al. | |
| 2013/0091944 A1* | 4/2013 | Tomiyama | E21B 47/00 73/152.54 |
| 2014/0347056 A1 | 11/2014 | Hayman et al. | |
| 2015/0241596 A1* | 8/2015 | Donderici | G01V 13/00 324/338 |
| 2016/0170068 A1* | 6/2016 | Donderici | G01V 3/28 324/339 |
| 2017/0227666 A1 | 8/2017 | Legendre et al. | |
| 2018/0120470 A1* | 5/2018 | Yamada | E21B 49/00 |
| 2018/0321385 A1* | 11/2018 | Embry | G01K 13/02 |
| 2021/0278562 A1* | 9/2021 | Wu | G01V 3/30 |

* cited by examiner

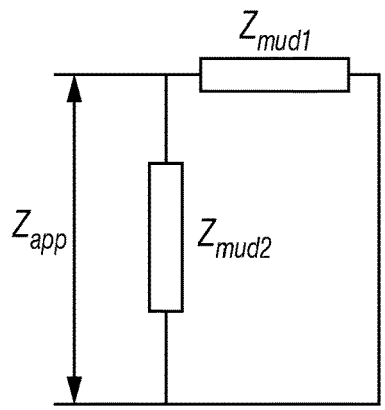
FIG. 6
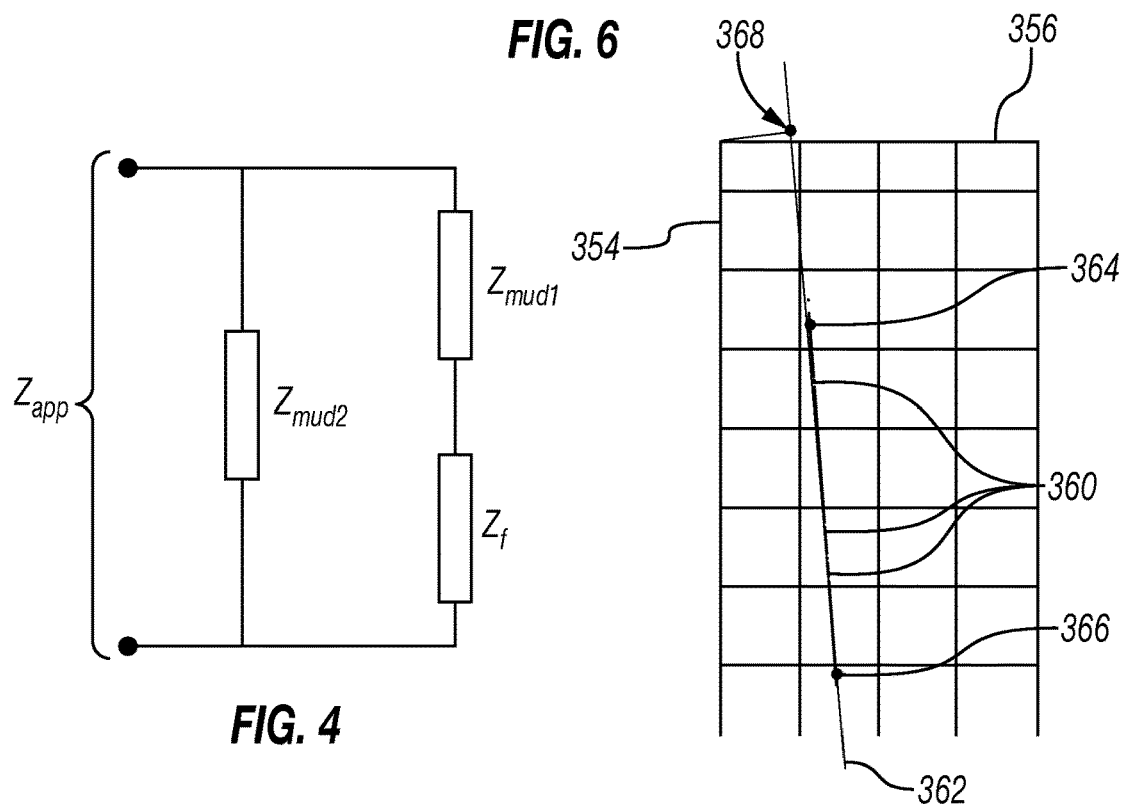
FIG. 4
FIG. 8
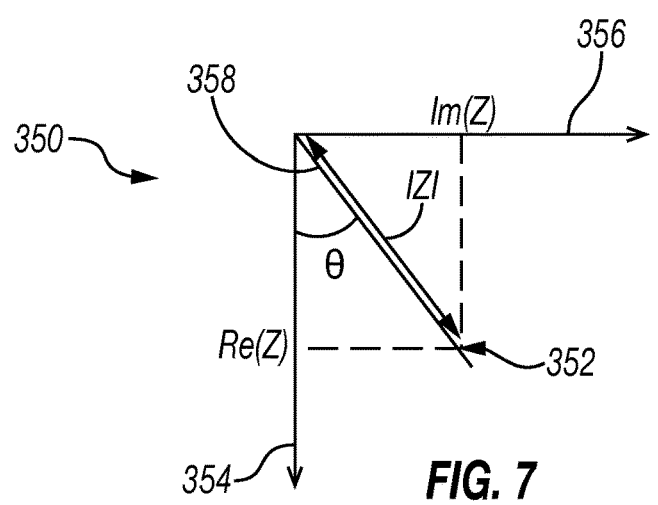
FIG. 7

METHOD TO AUTOMATICALLY CALIBRATE A DOWNHOLE TOOL IN AN OIL-BASED MUD ENVIRONMENT

BACKGROUND

The present disclosure relates to techniques for performing formation evaluation. More particularly, the present disclosure relates to techniques, such as calibrations, that may be used in performing measurement, imaging and/or other formation evaluations.

To locate and capture valuable hydrocarbons from subterranean formations, various wellsite tools may be used to perform various tasks, such as drilling a wellbore, performing downhole testing and producing downhole fluids. Downhole drilling tools may be advanced into the earth by a drill string with a bit at an end thereof to form the wellbore. Drilling muds (or other drilling fluids) may be pumped into the wellbore and through the drilling tool as it advances into the earth. The drilling muds may be used, for example, to remove cuttings, to cool the drill bit and/or to provide a coating along the wellbore. The drilling muds may be conductive or non-conductive drilling fluids (e.g., oil based muds (OBM), water based muds (WBM), etc.) During or after drilling, casing may be cemented into place to line a portion of the wellbore, and production tools may be used to draw the downhole fluids to the surface.

During wellsite activities, downhole measurements may be taken to collect information about downhole conditions. The downhole measurements may be taken of various wellsite parameters, such as temperature, pressure, permittivity, impedance, resistivity, gain factor, button standoff, etc. Downhole tools, such as the drilling tool, a testing tool, a production tool, or other tools, may be deployed into the wellbore to take the downhole measurements, such as formation resistivity. In some cases, downhole logs, images or other outputs may be generated from the downhole measurements.

However, the downhole measurement that is taken generally does not only characterize the formation: it is affected by the sensor itself but also by the drilling mud that is situated in the borehole, in particular when the tool is a LWD tool for which the distance between the sensor and the formation (ie standoff) is high. The tool performing the measurements therefore needs to be calibrated in order to have the measurement characterize at best the formation and eliminate influence of the other elements on the measurements.

Generally, the tools are calibrated at the workshop, and the calibration does not take into account the effect of the drilling fluid that is in the wellbore when the measurement is performed. However, when the drilling fluid is a non-conductive fluid such as oil-based mud, it has a very significant impact on the measurement and the accuracy of the measurement is greatly improved when the drilling fluid is taken into account in the calibration.

US 2014/0347056 discloses calibrating a tool used for a downhole measurement in-situ in the wellbore casing, before reaching an open hole portion of the borehole for a particular tool. This method is not appropriate for LWD tools.

SUMMARY

This summary is provided to introduce a selection of concepts that are further described below in the detailed description. This summary is not intended to identify indispensable features of the claimed subject matter, nor is it intended for use as an aid in limiting the scope of the claimed subject matter.

The disclosure relates to a method and apparatus for calibrating a resistivity measurement taken by a downhole tool in a borehole, wherein the downhole tool estimates the resistivity of an underground formation penetrated by the borehole with at least one sensor situated at a non-zero standoff distance from the borehole, is provided. The method includes taking apparent impedance measurements with the sensor at a set of frequencies and at a first plurality of locations in the borehole, wherein the measurement are uncalibrated measurements. The method also includes identifying a portion of the borehole in which the apparent impedance measurements at least at a first frequency of the set have a predetermined behavior. The predetermined behavior is that the apparent impedance measurements taken in the portion are substantially fitting a linear model when represented in the complex plane. The method also includes using a plurality of measurements obtained at a second plurality of location situated in said portion at the first frequency to determine calibration coefficients for the measurements at said frequency.

The calibration method according to the disclosure enables to calibrate LWD tools encountering multiple standoffs in any type of mud, even oil-based mud, directly in the borehole, considering the characteristics of the tool but also of the environment of the borehole (in particular the nature of the drilling fluid). It enables to obtain an accurate measurement without performing extra separate calibration operation.

The disclosure also relates to an apparatus for calibrating a resistivity measurement, wherein the apparatus includes a downhole tool configured to be conveyed in a borehole, and having at least one sensor situated at a non-zero standoff distance from the borehole. The sensor is configured to estimate the resistivity of an underground formation penetrated by the borehole by taking apparent impedance measurements at a set of frequencies and at a first plurality of locations in the borehole, wherein the measurement are uncalibrated measurements. The apparatus also includes a set of processors configured to identify a portion of the borehole in which the apparent impedance measurements at least at a first frequency of the set have a predetermined behavior. The predetermined behavior is that the apparent impedance measurements at the first frequency taken in the portion are substantially fitting a linear model when represented in the complex plane. The set of processors is also configured to use a plurality of measurements obtained at a second plurality of location situated in the portion at the first frequency to determine calibration coefficients for the measurements taken at the first frequency.

BRIEF DESCRIPTION OF THE DRAWINGS

Various aspects of this disclosure may be better understood upon reading the following detailed description and upon reference to the drawings in which:

FIG. 4 is a model of electrical circuit used for modelling measurements via the apparatus according to the disclosure in the formation, FIG. 6 is a model of electrical circuit used for modelling measurements via the apparatus according to the disclosure in the casing, FIG. 7 is a representation of an impedance measurement in a complex plane, FIG. 8 shows representation of measurements taken with the apparatus according to the disclosure in the complex plane.

DETAILED DESCRIPTION

One or more specific embodiments of the present disclosure will be described below. These described embodiments are examples of the presently disclosed techniques. Additionally, in an effort to provide a concise description of these embodiments, some features of an actual implementation may not be described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would still be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.'

Figure 1:
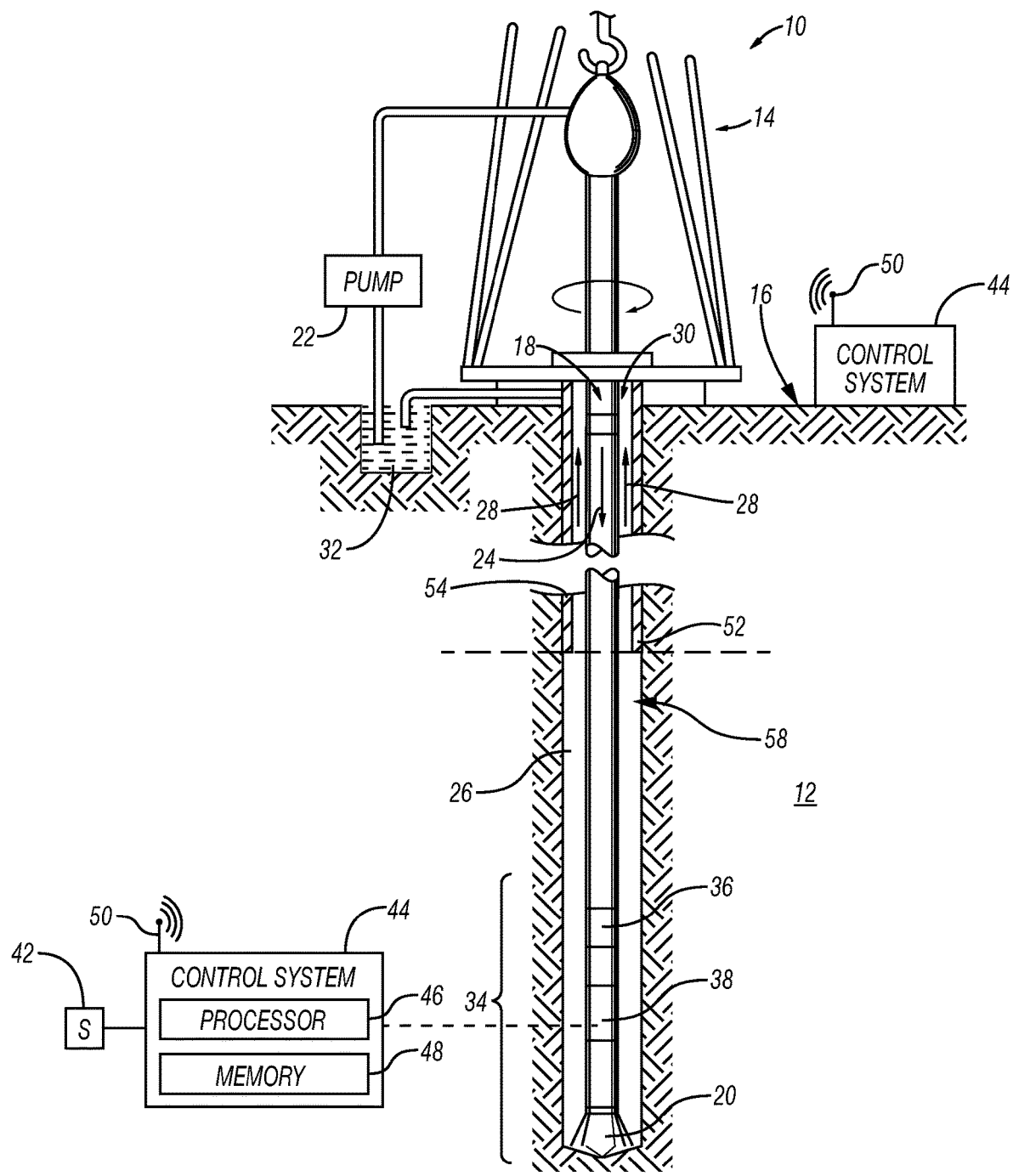
FIG. 1 is a schematic drawing of a drilling system including the apparatus as per the disclosure.

FIG. 1 is a schematic diagram of a drilling system 10, which may be used to drill a well or borehole through a geological formation 12. In the depicted example, a drilling rig 14 at the surface 16 rotates a drill string 18, which includes a drill bit 20 at its lower end to engage the sub-surface formation 12. To cool and/or lubricate the drill bit 20, a drilling fluid pump 22 may pump drilling fluid, referred to as "mud" or "drilling mud," downward through the center of the drill string 18 in the direction of the arrow 24 to the drill bit 20. At the drill bit 20, the drilling fluid may then exit the drill string 18 through ports. The drilling fluid may then flow in the direction of the arrows 28 through an annulus 30 between the drill string 18 and the geological formation 12 toward the surface 16. In this manner, the drilling fluid may carry drill cuttings away from the bottom of a borehole 26. Drill cuttings or "cuttings" include small pieces of rock or other debris that break away from the geological formation 12 as a result of drilling. Once at the surface 16, the returned drilling fluid may be filtered and conveyed back to a mud pit 32 for reuse.

Additionally, as depicted, the lower end of the drill string 18 includes a bottom-hole assembly 34 that includes the drill bit 20 along with a downhole tool 36, such as a measuring tool, a logging tool, or any combination thereof. Generally, the downhole tool 36 may facilitate determining characteristics of the surrounding formation 12. Thus, in some embodiments, downhole tool 36 may include one or more sensors 42. Further references to the sensor 42 may refer to one or more sensors 42 of the downhole tool 36. In some embodiments, the sensor 42 may include an acoustic sensor (for instance, an ultrasonic pulse-echo transducer), which may perform acoustic measurements returned from the surrounding formation 12. In some embodiments, the sensor 42 may include an electrical sensor (for instance, an electromagnetic transducer or receiver), which may perform electrical measurements (such as galvanic or inductive electrical measurement) returned from the surrounding formation 12.

As shown on FIG. 1, the borehole may be cased in its top portion 52, ie a casing 54 has been added to surround the borehole and is attached to formation with cement (not shown) situated between the casing and the formation. The casing insulates the borehole from the formation and consolidates the borehole. In this portion of the borehole, the drilling fluid does not contact the formation. The casing is generally a metallic tubing. On the contrary, in its bottom portion 58, the borehole is open hole, ie the drilling fluid circulating in the borehole directly contacts the formation. The measurements enabling to characterize the formation are generally taken in the open hole portion 58 of the borehole.

In some embodiments, a control system 44 may control operation of the downhole tool 36. For example, the control system 44 may instruct the downhole tool 36 to perform measurements using the sensor 42 and/or process the measurements to determine characteristics of the surrounding environment (e.g., formation 12). In some embodiments, the control system 44 may be included in the downhole tool 36. In other embodiments, the control system 44 may be separate from the downhole tool 36, for example, situated in another downhole tool or at the surface 16. In other embodiments, a portion of the control system 44 may be included in the downhole tool 36 and another portion may be located separate from the downhole tool 36.

When at least a portion is separate from the downhole tool 36, information (e.g., measurements and/or determined characteristics) may be transmitted to and/or within the control system 44 for further processing, for example, via mud pulse telemetry system (not shown) and/or a wireless communication system (not shown). Accordingly, in some embodiments, the downhole tool 36 and/or the control system 44 may include wireless transceivers 50 to facilitate communicating information.

To facilitate controlling operation, the control system 44 may include one or more processors 46 and one or more memory devices 48. Further references to "the processor 46" are intended to include the one or more processors 46. In some embodiments, the processor 46 may include one or more microprocessors, one or more application specific processors (ASICs), one or more field programmable logic arrays (FPGAs), or any combination thereof. Additionally, the memory 48 may be a tangible, non-transitory, machine-readable medium that stores instructions executable by and data to be processed by the processor 46. Thus, in some embodiments, the memory 48 may include random access memory (RAM), read only memory (ROM), rewritable flash memory, hard drives, optical discs, and the like.

Figure 2:
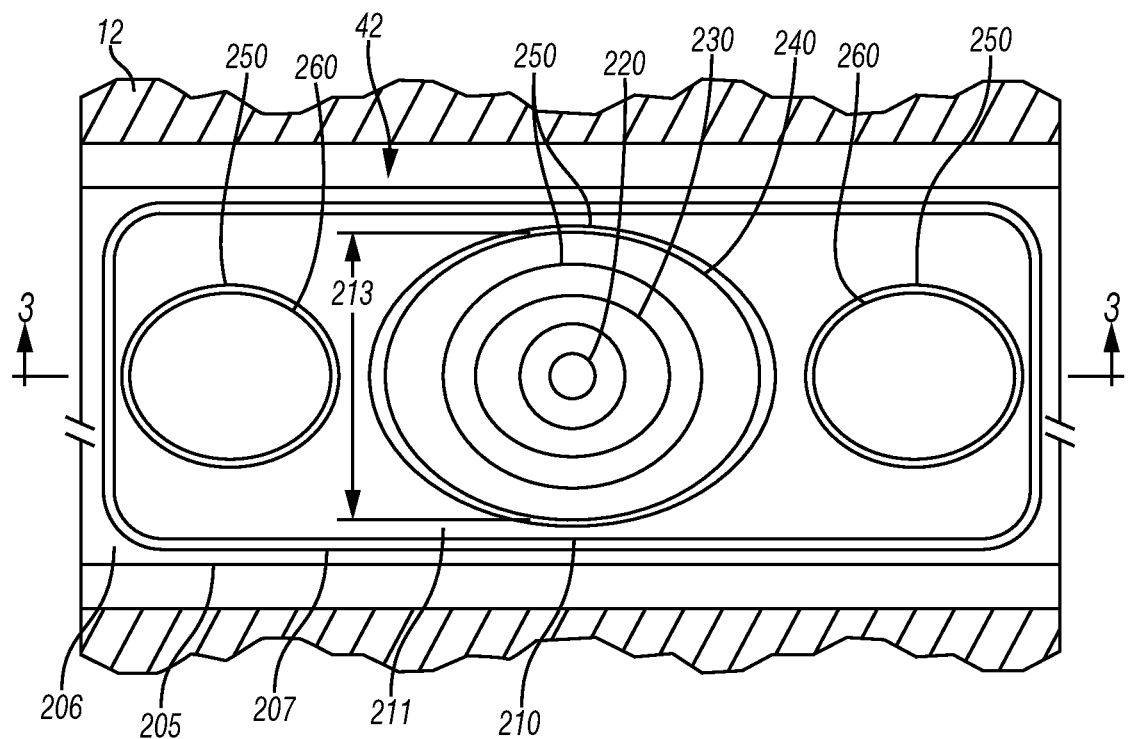
FIGS. 2 and 3 are views of a sensor of the apparatus for measuring resistivity of an underground formation according to an embodiment of the disclosure.
Figure 3:
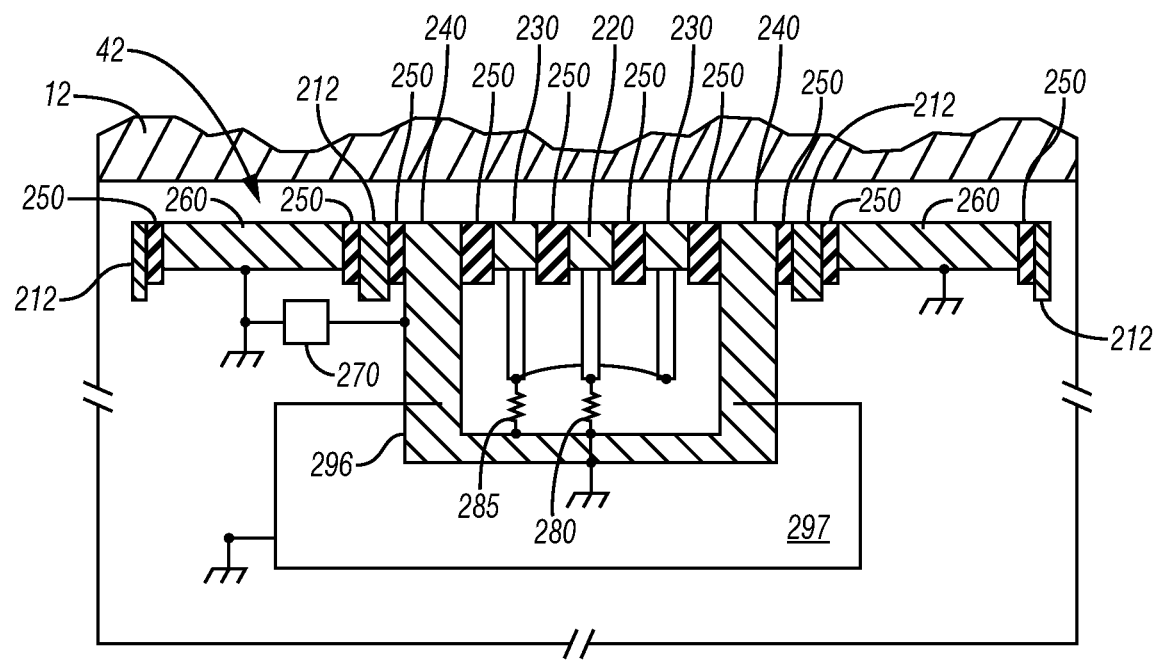

The downhole tool 36 may comprise a sensor 42 shown in FIGS. 2 and 3 used for measuring resistivity of the formation 12. The sensor disclosed in the figure is exemplary. The sensor 42 comprises or is otherwise carried with a tool collar 205. The tool collar 205 generally comprises a tubular member having interfaces (not shown) at one or both ends for coupling with other components of a tool string. The sensor 42 comprises a probe 210 having an exterior surface 211 that may be substantially flush with an exterior surface 206 of the tool collar 205. For example, the probe 210 may be received within a recess or other opening 207 in the exterior surface 206 of the tool collar 205. The probe 210 may be extendable away from the tool collar 205, whether via known or future-developed means, for instance a wireline pad.

The probe 210 comprises a button electrode 220, an inner or first guard electrode 230 surrounding the button electrode 220, and an outer or second guard electrode 240 surrounding the inner guard electrode 230. Insulating material 250 electrically isolates the button electrode 220, the inner guard electrode 230, and the outer guard electrode 240 from each other and from a body 212 of the probe 210. The probe 210 also comprises one or more return electrodes 260, which are each also isolated from the body 212 of the probe 210 by insulating material 250. However, the return electrodes 160 may be formed by at least portions of the tool collar 205 instead of as discrete members carried by the probe 210.

FIG. 4 also schematically depicts electrical components and connections between the elements described above. For example, one side of an excitation voltage source 270 is connected to one of the return electrodes 260 and local circuit ground, with the other side of the excitation voltage source 270 connected to the outer guard electrode 240. The other one or more return electrodes 260 are also connected to local circuit ground. A sampling resistor 280 having resistance $R_{BOG}$ (first impedance) connects the button electrode 220 to the outer guard electrode 240, and an additional resistor 285 having resistance $R_{IGOG}$ (second impedance) connects the inner guard electrode 230 to the outer guard electrode 240. The sampling resistor 280 and the additional resistor 285 may be positioned in a housing 296, such as may be delimited by the outer guard electrode 240.

FIG. 3 also illustrates an acquisition board 297 disposed within the tool 36. The housing 296 may contain the acquisition board 297, may be coupled with the acquisition board 297, or may be a distinct component separate from the acquisition board 297 but having one or more electronic components coupled with the acquisition board 297, such as the sampling resistor 280 and/or the additional resistor 185.

The sensor 42 shown in FIGS. 2-3 may be used for measuring resistivity of the formation 12. During such operations, an alternating current is applied between outer guard electrode 240 and a return electrode 260 via the voltage source 270. The voltage may be a high-frequency voltage, such as a frequency higher than about 100 kHz, or perhaps higher than one MHz, or even ten MHz. Then, the current circulating through the sampling resistor 280 is measured. On the basis of the measured current, a measured impedance $Z_f$ may be determined and related to the impedance $Z_{form}$ of the formation 20.

The sensor 42 disclosed here is a sensor according to an embodiment of the disclosure. A sensor according to such embodiment is disclosed in more details in WO2016/082925, hereby incorporated by reference in the current application. The tool according to the disclosure may also include other type of resistivity sensors. It is also understood that the downhole tool may also include a plurality of resistivity sensors 42, wherein the sensors are identical or different.

When the measurement with sensor 42 is taken is the open hole portion of the borehole, it is considered that the response of the resistivity tool can be modelled by a complex equivalent circuit as illustrated in FIG. 4. The complex equivalent circuit is formed as a first mud impedance $Z_{mud1}$ coupled in series with a measured impedance $Z_f$ representative of the formation impedance $Z_{form}$ and coupled in parallel with a second mud impedance $Z_{mud2}$, as illustrated by the equivalent circuit shown in FIG. 4. The formation impedance $Z_{form}$ is determined based on the measured total impedance $Z_{app}$.

The circuit model illustrated in FIG. 4 comprises the impedance $Z_f$, representative of the formation impedance $Z_{form}$, and a first mud impedance $Z_{mud1}$ in series, and also a parallel second mud impedance $Z_{mud2}$. The enhanced circuit model effectively represents a current leakage that occurs as the standoff distance between electrodes of the resistivity tool and the subterranean formation increases—which is the case when the measurement is a LWD measurement taken while drilling. Some of the current paths measured by the resistivity tool are indeed not passing through the subterranean formation. They correspond to the electrical branch comprising the second mud impedance $Z_{mud2}$. Other currents are passing through the formation and the drilling fluid, which correspond to the electrical branches comprising the measured impedance $Z_f$ and the first mud impedance $Z_{mud1}$. This circuit model thus takes into account the standoff distance between the electrodes of the resistivity tool and the surrounding subterranean formation, which distance may not be accurately known and/or which may corrupt a resistivity estimate of the subterranean formation.

In order to calculate the formation impedance $Z_{form}$ in view of the measured impedance $Z_f$ the measurement is taken at a plurality of frequencies that are preferably spanning a large range of frequencies, such as for instance [0.2, 400] megahertz ("MHz"). The method for determining the resistivity of the formation with a resistivity tool using such model is disclosed in more details in US2017/0227666, hereby incorporated by reference. However, the method for determining the resistivity described herein is an exemplary method. The calibration method according to the disclosure may be applicable to any tool using an electrical model similar to the one disclosed above for determining resistivity of the formation.

As explained hereinabove, such measurement needs to be calibrated to eliminate the effect of the sensor on the measurement. Furthermore, the tool must be calibrated to be able to characterize the formation no matter what the type of drilling fluid (ie mud) circulating in the formation is. An in-situ calibration in the casing enables to increase the measurement accuracy as the tool may be calibrated in the same mud that will be circulating in the borehole while the measurement of the formation resistivity will be performed. As the method that is used and includes a plurality of frequencies spanning a broad range, the calibration shall as well take the mud dispersion, ie the frequency response of the mud impedance, into account. The mud impedance as a function of the frequency is expressed as follows:

$$Z_{mud} = \alpha X_m \frac{F(\omega)}{\omega} \tag{1}$$

wherein $Z_{mud}$ is the mud impedance, w is the radial frequency, $\alpha X_m$ is a complex number depending on the standoff and $F(\omega)$ is a frequency-dependent dispersion function. The calibration method discloses therein enables to calibrate automatically the measurements at all of the frequencies, taking into account the sensor and mud effects on the measurements.

Figure 5A:
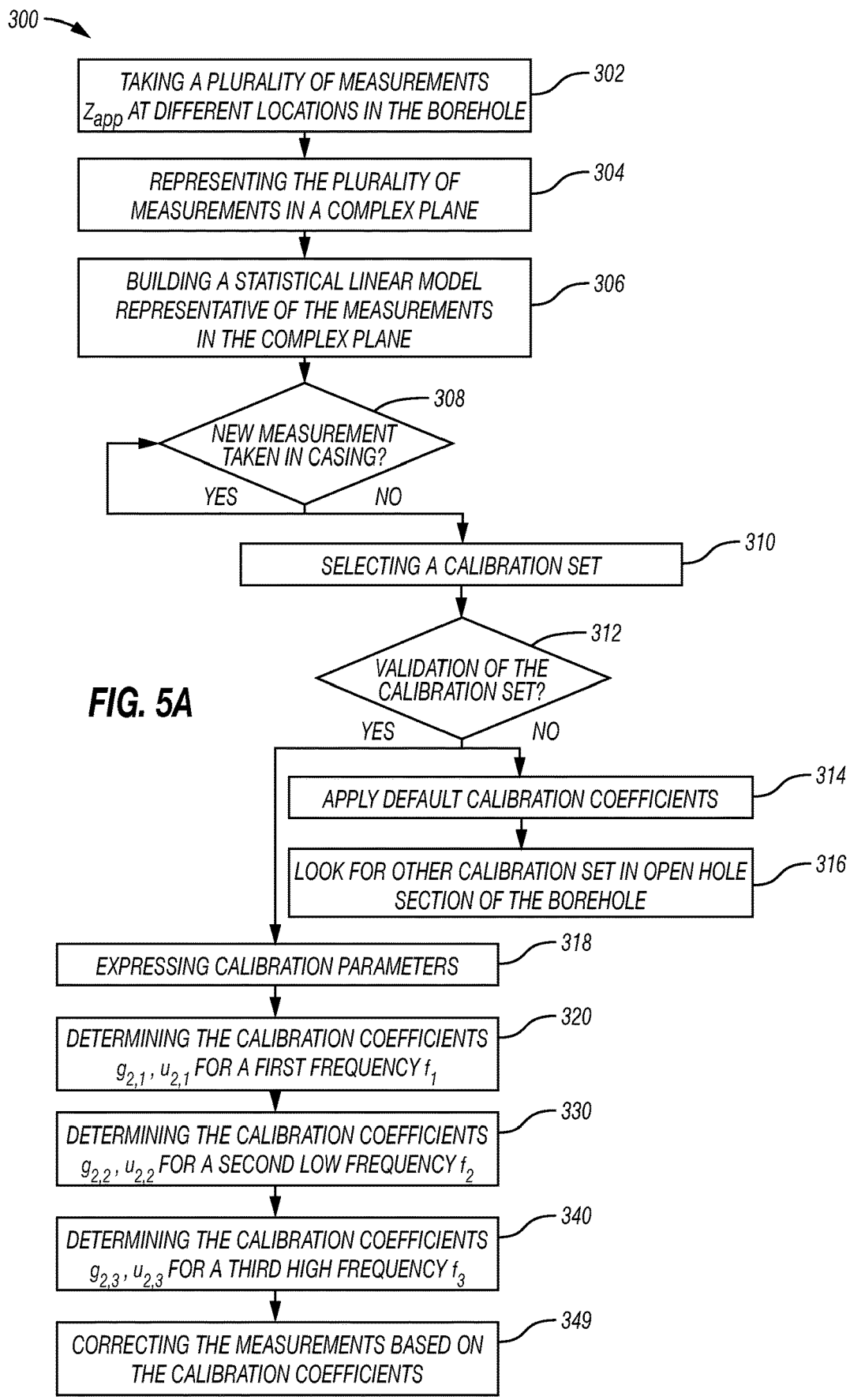
FIG. 5A is a flowchart showing an embodiment of the method according to the disclosure.

The calibration method 300 according to the disclosure will be disclosed in reference to FIG. 5A. It comprises taking (block 302) a plurality of measurements in the borehole at a plurality of locations while the tool is lowered in the borehole. As indicated, the borehole has a top cased hole section 52 and a bottom open hole section 58 in which the drilling fluid directly contacts the formation. The circuit model modelling the tool response in the formation has been already explained. In the cased hole portion of the borehole however, the tool does not sense the formation but rather sense the casing that is very conductive due to its metallic composition. Therefore, the equivalent circuit comprises a first mud impedance $Z_{mud1}$, and also a parallel second mud impedance $Z_{mud2}$ as represented on the model of FIG. 6. Some of the current paths measured by the resistivity tool are indeed not passing through the casing. They correspond to the electrical branch comprising the second mud impedance $Z_{mud2}$. Other currents are passing through the casing and the drilling fluid, which correspond to the electrical branches comprising the first mud impedance $Z_{mud1}$. The casing is considered as conductive enough to have no impedance contrary to the formation.

The calibration method then comprises representing all of the measured impedance in the complex plane (block 304). Indeed, in view of the above-mentioned models, when the tool is in the cased hole portion of the borehole, as $Z_{mud1}$ and $Z_{mud2}$ are proportional to the mud impedance $Z_{mud}$, the measured impedance linearly depends on the mud impedance. The measured impedance also depends on the standoff. On the contrary, when the measurements are taken in the formation, they do not anymore linearly depend on the mud impedance. Such representation in the complex plane is shown on FIG. 7. The representation 350 in the complex plane shows the measurement point Z 352 in the complex plan. The real part Re(Z) of the measured impedance Z is shown on the ordinate axis 354 and the imaginary part Im(Z) of the impedance in abscissa 356. The complex representation also enables to determine the modulus and phase of the impedance by tracing a line 358 between the measured impedance and the origin of the axis, the modulus |Z| being the distance between the measurement point and the origin while the phase is the angle θ between ordinate axis and line.

When representing all of the measured impedance in the complex plane, the calibrated measurements taken in the casing (taken first while the tool is lowered in the wellbore) will be approximately on a same line, with a same phase for each of the measured frequencies. The modulus of the measured impedance will also be dependent on the standoff. When the measurements are taken at several frequencies, the measurements at a first frequency may be represented separately from the measurements at a second frequency. In view of the above, when the measurements are taken at a plurality of frequencies, lines representing measurement at different frequencies may have the same slope.

The calibration method may then include building a statistical linear model representative of the measurement in casing based on a first set of measurements corresponding to the first measurements acquired in the borehole, for each of the frequency (block 306). This may be performed via a classic linear regression. A representation of a plurality of measurements 360 taken in casing at one frequency are represented on FIG. 8. It can be seen that the measurements perfectly fit the line 362.

The calibration method may then include determining if each new measurement is taken in the casing (block 308). When a new measurement is acquired, a criterion is assessed in order to determine if it can be taken into account to refine to linear model. The criterion may be that its distance from the resulting line is not greater than a threshold, or, taking into account several frequencies, that the difference between slopes of the lines representative of the measured resistivity at least at two different frequencies is not greater than a predetermined threshold. Of course, a combination of several criteria may be assessed. The beginning of the open hole section may also be identified based on the one or more criteria, i.e. when the one or more criteria are not met anymore. As it is well known that the cased hole and open hole portions of the borehole are not intricated and that the open hole section always follows the cased hole section, the open hole section may be detected via determining that a predetermined number of consecutive measurements do not match the one or more criteria relative to the predetermined linear model, as defined above.

The calibration method then includes selecting a calibration set of measurements (block 310) upon determining that the open hole section 58 has begun. This is fairly simple as all the measurements before the open hole section may be taken into account as the calibration sample. Of course, in order to have a more robust set of measurement points, a number of measurement points just before the open hole section has been reached may be discarded.

Figure 9:
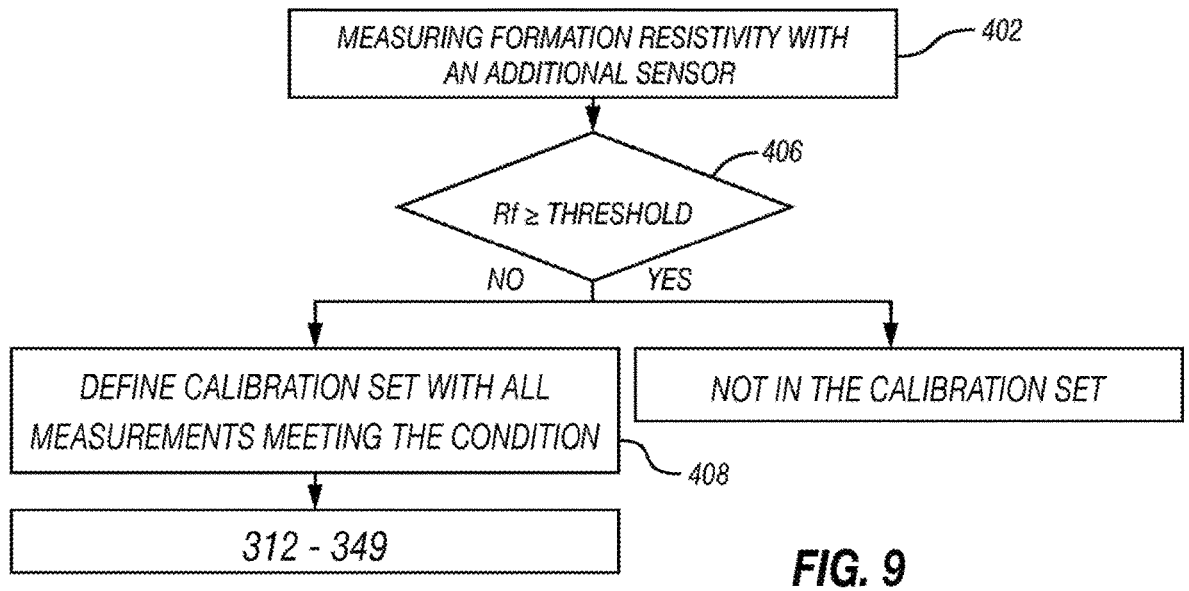
FIG. 9 is a flowchart showing another embodiment of the method according to the disclosure.

Before performing the calibration, the method may include validating the calibration set (block 312). This operation includes verifying that the set of measurements is representative of all of the conditions that may be found in a borehole, for instance a great diversity of standoffs. As it can be shown that the modulus of the measured impedance is dependent of the standoff measurement, a measured impedance representative of a minimal standoff (ie having a low modulus) may be compared to a measured impedance representative of a maximal standoff (ie having a high modulus). On FIG. 8, the measured impedance that will serve as a basis for the validation are represented in 364 and 366. They correspond for instance to the measurements having a modulus in the $n^{th}$ and $(100-n)^{th}$ quantile (with n being preferably less or equal to 10). The verification includes comparing one or more variable representative of the difference between both impedance (using a difference or a ratio for instance) to one or more corresponding predetermined threshold. Each threshold may be a constant or may depend of one or more features of the line statistically representing the measurements in the complex plane. The comparison may include verifying that the standoffs are different enough and/or if the measurements have a sufficiently wide distribution to be greater than the error fit. Based on the result, the calibration set may be considered as valid for an accurate calibration or not. If the calibration is not validated, default calibration coefficients may be applied to the measurements (block 314) and other calibration set may be looked for in the open hole section of the borehole (block 316), as will be explained later in reference to FIG. 9.

Alternatively, the calibration method according to the disclosure may detect that the conditions for the standoff diversity of a calibration are met, define the calibration sample on this basis and verify afterwards that all of the measurements (or only the measurement of the set taken last) is still in the casing to validate the calibration sample.

Further, the method 300 is disclosed as performed in real-time. However, the method may be performed once the entire set of measurement for the borehole has been obtained, as post-processing, in which case the measurements may not be evaluated one after another.

The method according to the disclosure therefore offers a calibration on the basis of a great number of measurements that is robust and without any need to trigger the measurement of well-chosen calibration points from the surface. When validating the measurement with additional criteria such as the standoff diversity, it enables to make sure that the calibration will be representative of all of the conditions that may be found in the borehole and therefore will enable accurate measurement.

Once the calibration sample has been validated, the method includes expressing (block 318) the calibration parameters (also designated as the calibration coefficients). The calibration coefficients may be expressed as part of a linear model. Such coefficients will account for most of the effects due to the tool and the drilling fluid on the measurement. However, other type of model might be used, for instance polynomial models having a greater order than 1. As an example, calibration coefficients may be expressed as follows:

$$\text{ZAPPa\_CAL\_F}b = g_{a,b} \cdot \text{ZAPPa\_UNC\_F}b + u_{a,b}, \; a=1 \ldots N; \; b=1 \ldots M \quad (2)$$

wherein ZAPPa_CAL_Fb is the calibrated measurement (unknown) for the sensor a and frequency b (for a downhole tool having N sensors operating at M frequencies), ZAPPa_UNC_Fb is the uncalibrated measurement (known) for the sensor a and frequency b, and $g_{a,b}$ and $u_{a,b}$ are complex parameters that the calibration operation seeks to determine. It is important to note that $g_{a,b}$ and $u_{a,b}$ have different values for each of the N sensors and each of the M frequencies.

Figure 5B:
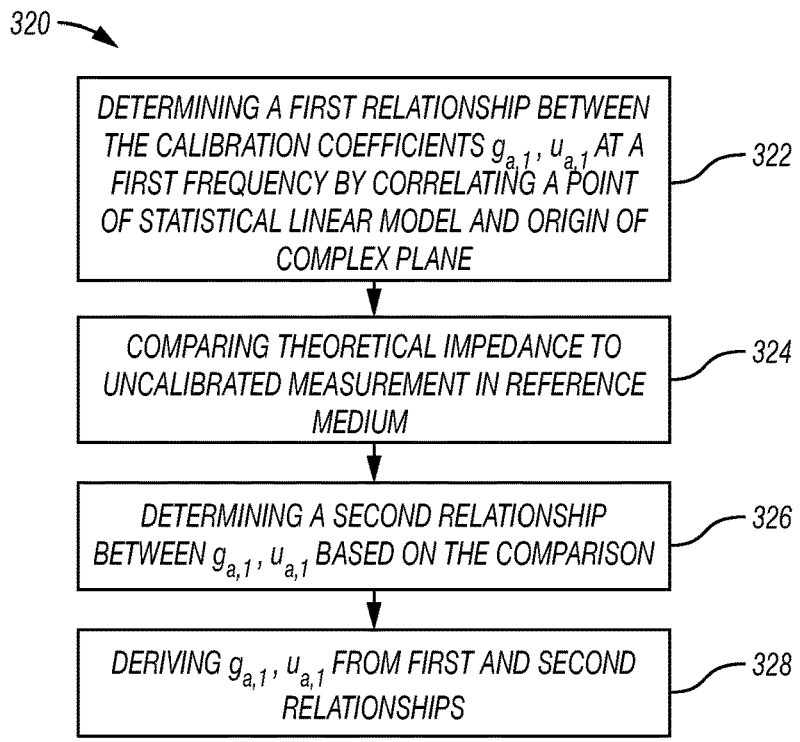
FIG. 5B-5D are flowcharts showing details of operations of the method of FIG. 5A.

The method then includes determining (block 320) the calibration coefficients ga,1 and ua,1 for measurements taken at a first reference frequency f1, which is a low frequency, i.e. a frequency under a threshold (about 10 MHz for the sensor presented hereinabove but the threshold value may depend on architecture of the sensor). Frequency f1 is for instance the lowest measurement frequency. The details of operation 320 are represented on FIG. 5B. The method takes a first hypothesis, which is the following: the line statistically representing the measurements should, once calibrated, contain the origin of the axis (when there is no standoff, the tool is directly in contact with the casing and does not measure any impedance). A point on the line is therefore chosen as the point that should be the origin of the axis. Here, the selected point is the point 368 being at minimal distance i.e. the orthogonal projection from the origin of the axis but other points may be chosen. All the measurements of the sensor at frequencies 1 ... M are calibrated as a function of the calibration hypothesis at the reference frequency f1. In other words, the method includes determining a first relationship between the calibration coefficients for the measurement at the first reference frequency by correlating a point taken on the statistical linear model with the origin of the complex plane (block 322).

Determining the calibration coefficients ga,1 and ua,1 for measurements taken at the first reference frequency also includes comparing (block 324) theoretical impedance in a non-dispersive reference medium, such as air, to uncalibrated measurement in this medium obtained with the sensor a and determining (block 326) a second relationship between the calibration coefficients for the measurement at the first reference frequency based on such comparison. The uncalibrated measurement may have been taken before the job once and for all and may be re-used at each new calibration and/or may be modelled in view of the tool parameters. For low frequencies, it is indeed considered that the measurement is not significantly affected by the mud dispersion or sensor size and that the calibration coefficients are the same or proportional for the reference medium and mud. Determining the calibration coefficients for a low frequency then includes deriving (block 328) from the first and second relationship both calibration coefficients $g_{a,1}$ and $u_{a,1}$.

The determination 320 may be performed for all of the sensors that are situated in the borehole and have to be calibrated. Therefore, the output of the determination 320 may be all of the coefficients $g_{a,1}$ and $u_{a,1}$ with a=1 ... N.

The method may also include determining (block 330) the calibration coefficients $g_{a,2}$ and $u_{a,2}$ for measurements taken at least a second frequency f2 lower than the predetermined threshold. The determination 324 may also be performed for all of the frequencies fj under the threshold.

Figure 5C:
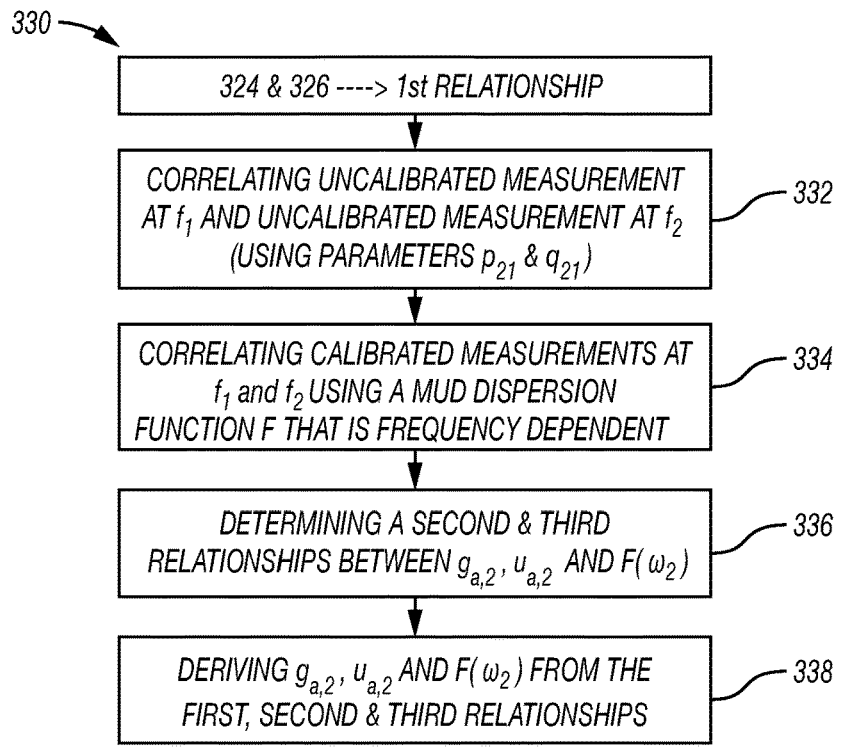

The details of the operation 330 are represented on FIG. 5C. The method first comprises operations 324 and 326 already disclosed above, which will give a first relationship between the calibration coefficients $g_{a,2}$ and $u_{a,2}$.

However, as all of the measurements must be calibrated as a function of the calibration at the reference frequency f1 in order to have coherent measurements, it is not possible to use the same operation that has been performed at 322. It would indeed lead to a non-coherent calibration. Therefore the calibration coefficients $g_{a,2}$ and $u_{a,2}$ are determined using the calibration coefficients $g_{a,1}$ and $u_{a,1}$ obtained for the first reference frequency.

The method includes correlating (block 332) uncalibrated measurements taken at the reference frequency f1 and uncalibrated measurement taken at second frequency f2. In view of the linear nature of the response, a relationship may be found between the uncalibrated measurement at both frequencies, that is mathematically expressed as follows:

$$\text{ZAPPa\_UNCAL\_F2} = p_{a21} \cdot \text{ZAPPa\_UNCAL\_F1} + q_{a21} \quad (3)$$

wherein ZAPPa_UNCAL_F2 Fb is the uncalibrated measurement (known) for the sensor a and frequency f2, ZAPPa_UNC_F1 is the uncalibrated measurement (known) for the sensor a and frequency f1, and $p_{a21}$ and $q_{a21}$ are complex parameters.

The method also includes correlating the calibrated measurements (block 334) by expressing the impedance at the second frequency f2 as a function of the impedance of the first reference frequency f1. As the impedance measured at each frequency are both depending on the mud impedance, for each frequency j, the impedance may be expressed as follows:

$$\text{ZAPPa\_CAL\_F}j = \alpha X_m \frac{F(\omega j)}{\omega j},$$

as indicated above, wherein ωj is the radial frequency (ωj=2πfj), the impedance at frequency f2 may be expressed as follows:

$$\text{ZAPPa\_CAL\_F2} = \text{ZAPPa\_CAL\_F1} \times \frac{F(\omega 2)}{\omega 2} \times \frac{\omega 1}{F(\omega 1)} \quad (4)$$

This relationship includes one additional unknown parameter which is F(ω2). Indeed, F(ω1) is known from the previous computation from equation $$\text{ZAPPa\_CAL\_F1} = \alpha X_m \frac{F(\omega 1)}{\omega 1}.$$

As frequency f1 is taken as the reference frequency, it is considered that |F(ω1)|=1 and the phase of F(ω1) is related to the phase of ZAPPa_CAL_F1 as the term $\alpha X_m$ only has an influence on the modulus of the impedance (as shown by the linear measurements). When the calibration includes the calibration of several sensors, it may be interesting to determine the dispersion function of the mud as a function of the different sensors. Indeed, the properties of the mud should be the same for all of the measurements. Therefore, the phase of F(ω1) may be defined as the average of the phases obtained at first frequency f1 for all of the calibrated sensors. This gives more robustness to the calibration.

The method then comprises determining a second and third relationship between the calibration coefficients $g_{a,2}$ and $u_{a,2}$ and F(ω2) based on the correlations of uncalibrated measurements performed at 332 and of the calibrated measurements performed at 334 (block 336). This operation is performed first by determining the complex parameters $p_{a21}$ and $q_{a21}$ which is made possible by using a plurality of uncalibrated measurements taken in the casing, and then to determine a relationship between the coefficients $g_{a,2}$, $u_{a,2}$ and F(ω2) based on $p_{a21}$ and $q_{a21}$ and $g_{a,1}$ and $u_{a,1}$ using also the correlations (equations (3) and (4)) as well as the relationship for each frequency between calibrated and uncalibrated measurements (see equation (2) above).

Determining the calibration coefficients then includes deriving (block 338) from the first, second and third relationships both calibration coefficients $g_{a,2}$ and $u_{a,2}$.

The determination 330 may be performed for all of the sensors that are situated in the borehole and have to be calibrated. Therefore, the output of the determination 330 may be all of the coefficients $g_{a,2}$ and $u_{a,2}$ with a=1 . . . N.

Figure 5D:
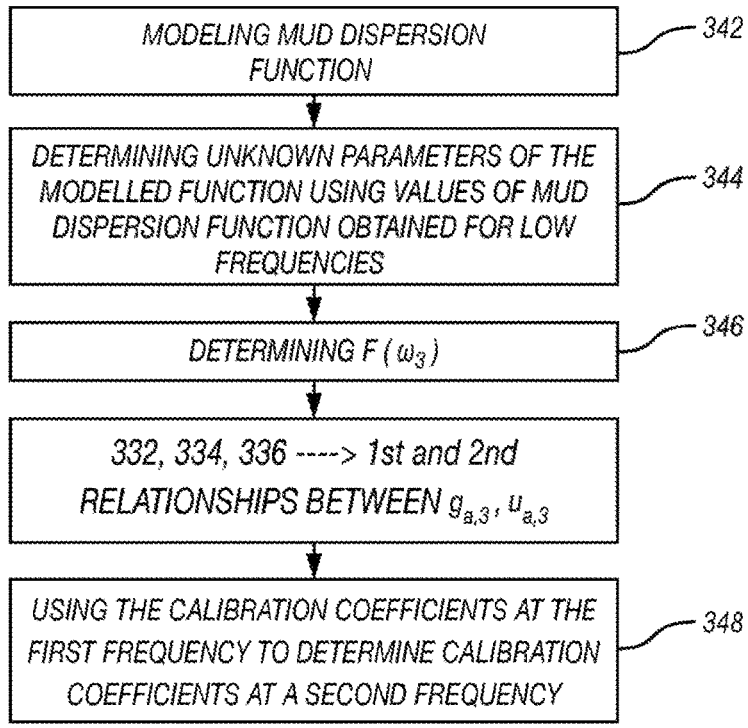

The method may also include determining (block 340) the calibration coefficients $g_{a,3}$ and $u_{a,3}$ for measurements taken at least a third frequency f3 higher than the predetermined threshold. The determination 336 may also be performed for all of the frequencies fj above the threshold. This determination cannot use the measurement in non-dispersive medium to calibrate the measurement at high frequency as other parameters of the tool or the environment may have a higher influence at such frequencies. The details of such operation are shown on FIG. 5D.

The determination 340 first comprises modelling (block 342) the mud dispersion function. The mud dispersion function may be modelled using any appropriate model.

The determination 340 then comprises determining (block 344) the unknown parameters of the mud model using the pre-determined values of F(ω1) and F(ω2) and mud dispersion value for any other frequency below the predetermined frequency threshold defined above. As explained above for F(ω1), F(ω2) may be determined taking into account the values of the dispersion function obtained for several sensors. The method therefore includes obtaining (block 346) a value of the function F(ω3) for the frequency f3 (it is reminded that ω3=2πf3). Of course, when the coefficients are sought for several frequencies above the threshold, operation 342, 344 may be performed once and taken into account in the determination of the calibration coefficients for each frequency.

The determination also comprises correlating uncalibrated measurements taken at one of the frequencies for which the calibration has already been performed (f1 or f2) and uncalibrated measurement taken at frequency f3, as explained in relationship with operation 332. Based on the measurement taken at frequency f1, the correlation may be expressed as follows:

$$\text{ZAPPa\_UNCAL\_F3} = p_{a31} \cdot \text{ZAPPa\_UNCAL\_F1} + q_{a31} \quad (5)$$

wherein ZAPPa_UNCAL_F3 is the uncalibrated measurement (known) for the sensor a and frequency f3, ZAPPa_UNC_F1 is the uncalibrated measurement (known) for the sensor a and frequency f1, and $p_{31}$ and $q_{31}$ are complex parameters. It also comprises correlating calibrated measurements at frequency f3 and calibrated measurement taken at one of the frequencies for which the calibration has already been performed (f1 or f2), as explained in relationship with operation 334. Based on the measurement taken at frequency f1, the correlation may be expressed as follows:

$$\text{ZAPPa\_CAL\_F3} = \text{ZAPPa\_CAL\_F1} \times \frac{F(\omega 3)}{\omega 3} \times \frac{\omega 1}{F(\omega 1)} \quad (6)$$

In view of the model previously determined F(ω3) is not an unknown parameter.

The method then comprises deriving the calibration coefficients $g_{a,3}$, $u_{a,3}$ based on the correlations of calibrated measurements performed at 336 and of the uncalibrated measurements performed at 334 (block 348). This operation is performed first by determining the complex parameters $p_{a31}$ and $q_{a31}$ and then by determining the coefficients $g_{a,2}$, $u_{a,2}$ based on $p_{a21}$ and $q_{a21}$, F(ω3) and $g_{a,1}$ and $u_{a,1}$ using the correlations as well as the relationship for each frequency between calibrated and uncalibrated measurements (see equation (5) and (6) above).

Once the coefficients have been determined for each of the sensors and each of the frequency, the measurements taken in the formation may be corrected (block 349) using the coefficients $g_{a,b}$ and $u_{a,b}$ that have been determined previously during the calibration. If a sensor a obtains a measurement Zmeas at a frequency fb, the measurement will be corrected using the coefficients $g_{a,b}$ and $u_{a,b}$ as follows in order to correct the measurement and then determining the resistivity of the formation based on such measurement:

$$Z_{corr} = g_{a,b} Z_{meas} + u_{a,b}$$

The method that is presented above enables to calibrate automatically the sensor in the formation, taking into account the parameters of the borehole environment and without any previous operation or control from the operators at the surface.

Alternatively, it is also possible to calibrate the sensors when measurements are taken in a formation where at least two of the operating frequencies are mainly sensitive to the mud. This is possible for instance when a formation has a very low resistivity. Indeed, when the apparent resistivity is less than a threshold the apparent impedance still has a linear behavior, at least at the lowest frequencies. An exemplary method 400 for using the open hole section is disclosed in relationship with FIG. 9.

The method 400 may include, if there is no casing or calibration cannot be performed based on the casing in view of the borehole or job parameters, measuring the resistivity Rt with an additional sensor (block 402). Any known sensor and resistivity determination method may be used.

The formation resistivity Rt is then compared to a predetermined threshold (block 406). The threshold is generally below 5 ohm·m. This operation enables indeed to identify a portion of the wellbore in which the measurement has a linear behavior, at least for frequencies below the threshold as defined above.

If the formation resistivity measured with the additional sensor is below the predetermined threshold, the calibration method may be performed for the whole set of measurements for which the condition is met. In other words, the calibration set is selected (block 408) as per the condition of operation 406. This operation then corresponds to operation 310 of method 300. The method 400 may then comprise the operations 312-349 of method 300.

Additional verification may be performed before launching the calibration. For instance, the method may also comprise representing in the complex plane the measured impedance over a depth interval corresponding to the interval at which resistivity is under the threshold. If the representation of the impedance measurements is linear over the interval, at least at two frequencies, the calibration method may be launched.

In this case, there are however a few changes. In particular, the method includes expressing the calibration parameters as in operation 318 but the expression is different compared to the one of method 300. The expression indeed varies from when the calibration is performed in the casing as the model still has to take into account the formation resistivity. The calibrated measurement is expressed as follows:

$$ZAPP\_CAL = ZAPP\_MUD + kf \cdot Rt$$

The calibration measurement may also be expressed as follows:

$$ZAPP\_CAL = g \cdot ZAPP\_UNCAL + u$$

Therefore, in this case, the measurement corresponding to mud impedance that enables to perform the calibration shall be expressed as:

$$ZAPP\_MUD = g \cdot ZAPP\_UNCAL + (u - kf \cdot Rt)$$

Wherein ZAPP_MUD is the calibrated measurement accounting for the mud impedance (unknown), ZAPP_UNCAL is the uncalibrated measurement, g and u are calibration parameters, Rt is the formation resistivity (determined at operation 404) and kf is a geometrical factor having a known value at low resistivity (its value may for example be determined by simulation or modelling).

Figure 10:
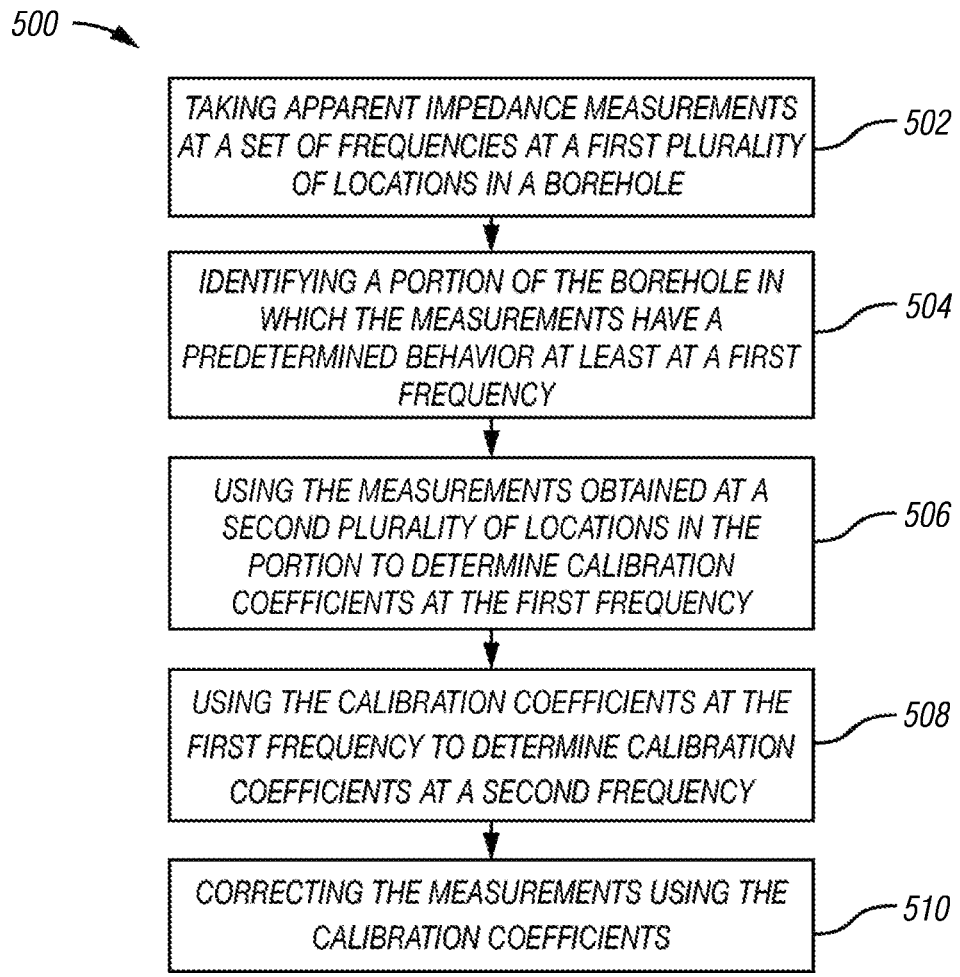
FIG. 10 is a flowchart showing another embodiment of the method according to the disclosure

More generally a method 500 according to the disclosure (shown on FIG. 10) includes taking (block 502) apparent impedance measurements with the sensor at a set of frequencies comprising at least one frequency and at a first plurality of locations in the borehole, wherein the measurement are uncalibrated measurements. The measurements may be taken at several frequencies and the method may be launched in real-time or after the measurements have been acquired for the whole borehole. The method may then include identifying a portion of the borehole in which the apparent impedance measurements has a predetermined behavior at least at a first frequency (block 504), wherein the predetermined behavior is that the apparent impedance measurements taken in the portion are substantially fitting a linear model when represented in the complex plane. The portion may be a cased hole portion or an open hole portion penetrating a formation having a resistivity below a predetermined threshold. In the latter case, identifying the portion may include estimating a formation resistivity based on measurements taken with one or more additional sensors and comparing the measured resistivity to the threshold. Alternatively, the method may include representing apparent impedance measurements taken at the at least one frequency in a complex plane, in particular the measurements taken at the second plurality of locations, and fitting a line to the plurality of measurements obtained at a second plurality of locations. Identifying the portion may include verifying that the standard deviation of the measurement points compared to the fitting line is under a threshold. When the set comprises a plurality of frequencies, identifying the portion may also include comparing the slope of a fitting line obtained for measurements taken at the first frequency to a fitting line obtained for measurements taken at a second frequency of the plurality. The measurements taken at the second plurality of locations is a calibration set, and the method includes validating the calibration set, by verifying if one or more criteria relative to the set are met. Such criteria may relate to the standoff, in order to verify that the standoffs are diverse and provide a robust calibration.

The method then includes using a plurality of measurements obtained at a second plurality of location situated in said portion at the first frequency to determine calibration coefficients for the measurements taken at the first frequency (block 506). The second plurality of locations may be a subset of the first plurality of locations. The calibration coefficients may be defined as follows $ZAPP\_CAL\_Fb = g_b \cdot ZAPP\_UNC\_Fb + u_b$, wherein $ZAPP\_CAL\_Fb$ is a calibrated measurement at frequency fb, wherein $ZAPP\_UNC\_Fb$ is the uncalibrated measurement at frequency fb and wherein $g_b$ and $u_b$ are the calibration coefficients for frequency fb. When the downhole tool comprises a plurality of sensors, the calibration coefficients are determined separately for each sensor.

Operation 506 may include selecting a predetermined point on the corresponding fitting line and calculating a first relationship between the calibration coefficients so that this point corresponds to the origin of the complex plane when the measurements are calibrated. It may also include determining a correlation between uncalibrated measurement and theoretical measurement in a non-dispersive medium (such as air) and calculating a second relationship between the calibration coefficients for the first frequency based on the correlation. The calibration coefficients may be determined based on the first and the second relationship. The first frequency is therefore below a first threshold, the threshold may be 10 MHz When the method includes a plurality of frequencies, it may also include using the calibration coefficients for the measurements at the first frequency to determine the calibration coefficients for the measurements at a second frequency (block 506). This operation may for instance include correlating uncalibrated measurements taken at the first frequency to uncalibrated measurements taken at the second frequency with the following expression:

$$ZAPP\_UNC\_F2 = p_{21} \cdot ZAPP\_UNC\_F1 + q_{21}$$

Wherein $ZAPP\_UNC\_F2$ is a uncalibrated measurement taken at the second frequency, Wherein $ZAPP\_UNC\_F1$ is a corresponding uncalibrated measurement taken at the first frequency, Wherein $p_{21}$ and $q_{21}$ are unknown coefficients, wherein the method further comprises calculating $p_{21}$ and $q_{21}$ using the measurements taken at the second plurality of locations at first and second frequencies.

The operation 506 may also include correlating calibrated measurements taken at the first frequency to calibrated measurements taken at the second frequency with the following expression:

$$\text{ZAPP\_CAL\_F2} = \text{ZAPP\_CAL\_F1} \times \frac{F(\omega 2)}{\omega 2} \times \frac{\omega 1}{F(\omega 1)}$$

wherein ZAPP_CAL_F2 is a uncalibrated measurement taken at the second frequency, wherein ZAPP_CAL_F1 is a corresponding uncalibrated measurement taken at the first frequency, wherein $\omega 1$ and $\omega 2$ are the radial frequencies respectively corresponding to the first and second frequencies and wherein $F(\omega)$ is a dispersion function of a drilling fluid filling the borehole.

When the second frequency is below the predetermined threshold, the operation 506 may include determining a correlation between uncalibrated measurement and theoretical measurement in a non-dispersive medium and calculating a first relationship between the calibration coefficients based on the correlation, as well as determining a second and a third relationship between the calibration coefficients and the value $F(\omega 2)$ of the dispersion function at the second frequency based on the correlation between uncalibrated measurements at first and second frequencies and correlation between calibrated measurements at first and second frequency, wherein the method includes determining the calibration coefficients and value $F(\omega 2)$ of the dispersion function at the second frequency based on the first, second and third relationships.

Alternatively, the method may include, in particular when the second frequency is above the predetermined threshold, modelling the dispersion function $F(\omega)$ according to a predetermined model and determining parameters of the model for instance based on values of the dispersion function obtained at least at two reference frequencies (generally below the threshold). When the tool comprises several sensors at least a value of the dispersion function used in the modelling is a combination of the values obtained for each of the plurality of sensors. In this case determining a value of the dispersion function at said reference frequency is based on the uncalibrated measurements at said reference frequency and includes determining a correlation between uncalibrated measurement and theoretical measurement in a non-dispersive medium (as explained above). The calibration coefficients for the second frequency are then calculated based on the correlation of the between uncalibrated measurements at first and second frequency and correlation between calibrated measurements at first and second frequency.

The method may also include (block 510) correcting the (uncalibrated) apparent impedance measurements using the calibration coefficients. The measurements taken at all of the plurality of locations in the borehole may be corrected using the coefficients determined as defined above. The resistivity of the formation is determined based on the corrected or calibrated measurements.

The method according to the disclosure is generally performed in a borehole containing oil-based mud and is particularly appropriate for a LWD tool for which the standoff with the borehole wall is more important. The method according to the disclosure provides an automated on-site calibration that does not require intervention of the operator before or during the measurement acquisition.

The disclosure also relates to an apparatus for calibrating a resistivity measurement, wherein the apparatus includes a downhole tool configured to be conveyed in a borehole, and having at least one sensor situated at a non-zero standoff distance from the borehole configured to estimate the resistivity of an underground formation penetrated by the borehole by taking apparent impedance measurements at a set of frequencies comprising at least one frequency at a first plurality of location in the borehole, wherein the measurement are uncalibrated measurements. The apparatus also includes a set of processors including one or more processors configured to identify a portion of the borehole in which the apparent impedance measurements at least at a first frequency of the set have a predetermined behavior, wherein the predetermined behavior is that the apparent impedance measurements at the at least one first frequency taken in the portion are substantially fitting a linear model when represented in the complex plane, and use a plurality of measurements obtained at a second plurality of location situated in said portion at the first frequency to determine calibration coefficients for the measurements taken at the first frequency.

The downhole tool may be a logging while drilling tools. It may also comprise several sensors. In the latter case, the set of processors is configured to determine calibration coefficients at the first frequency for each of the sensor. The sensor may be configured to take apparent impedance measurements at a plurality of frequencies. In the latter case, the set of processors may be configured to use the calibration coefficients for the measurements at the first frequency to determine the calibration coefficients for the measurements at a second frequency. The set of processors may be situated downhole, at the surface, remotely from the rig or partially downhole, and/or partially at the surface and/or partially remotely. They may be configured to execute one or more operations of the method as disclosed above.

The disclosure also relates to a computer readable storage medium comprising instructions to identify, based uncalibrated apparent impedance measurements at a set of frequencies comprising at least one frequency at a first plurality of location in a borehole by a downhole tool conveyed in the borehole, a portion of the borehole in which the apparent impedance measurements at least at a first frequency of the set have a predetermined behavior, wherein the predetermined behavior is that the apparent impedance measurements at the at least one first frequency taken in the portion are substantially fitting a linear model when represented in the complex plane, and using a plurality of measurements obtained at a second plurality of location situated in said portion at the first frequency to determine calibration coefficients for the measurements taken at the first frequency.

Generally, the computer storage medium comprises instructions for performing one or more operations of the method as mentioned above.

The systems and methods introduced in the present disclosure are susceptible to various modifications, variations, and/or enhancements without departing from the scope of the present disclosure. For example, different configurations can be employed for the resistivity tool to accommodate a downhole tool or other challenging environment. Accordingly, the present disclosure expressly encompasses all such modifications, variations, and enhancements within its scope.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same purposes and/or achieving the same advantages of the embodiments introduced herein. A person having ordinary skill in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to comply with 37 C.F.R. § 1.72(b) to allow the reader to quickly ascertain the nature of the technical disclosure. It is submitted with the understanding that it will not be used to interpret or limit the scope or meaning of the claims.

The invention claimed is:

1. A method comprising:
    conveying a logging tool in a borehole, the borehole including an oil-based drilling fluid, the logging tool including a resistivity sensor disposed in a tool collar, and the resistivity sensor having a button electrode configured to make impedance measurements;
    causing the resistivity sensor to make a plurality of uncalibrated impedance measurements at a corresponding plurality of locations in the borehole while the logging tool is conveyed in the borehole, the plurality of uncalibrated impedance measurements including a first set of measurements made at a first set of locations in the borehole and a second set of measurements made at a second set of locations in the borehole;
    identifying the first set of measurements by fitting a linear model to the first set of measurements in a complex plane that plots an imaginary component of each of the first set of measurements with respect to a real component of each of the first set of measurements;
    processing the linear model to compute first and second complex valued calibration coefficients;
    applying the first and second calibration coefficients to the second set of measurements to compute calibrated impedance measurements to account for effects of the resistivity sensor or the oil-based drilling fluid on the uncalibrated impedance measurements; and
    determining characteristics of a formation defining the borehole based on the calibrated impedance measurements.

2. The method according to claim 1, wherein the first set of locations is a cased section of the borehole and the second set of locations is an open hole section of the borehole.

3. The method according to claim 1, wherein the first set of locations is an open hole portion of the borehole defined by the formation, the formation having a resistivity below a predetermined threshold.

4. The method according to claim 1, wherein the first and second calibration coefficients are applied to the second set of measurements using the following equation:

ZAPP_CAL_$Fb$=$g_b$·ZAPP_UNC_$Fb$+$u_b$ wherein ZAPP_CAL_Fb represents the computed calibrated impedance measurements at frequency fb, ZAPP_UNC_Fb represents the uncalibrated impedance measurements at frequency fb, and $g_b$ and $u_b$ represent the first and second complex valued calibration coefficients.

5. The method according to claim 1, wherein the processing the linear model comprises:
    selecting a predetermined point on the linear model and calculating a first relationship between the first and second complex valued calibration coefficients so that the predetermined point corresponds to the origin of the complex plane when the uncalibrated impedance measurements are calibrated;
    correlating an uncalibrated measurement made in a non-dispersive medium and a theoretical measurement in the complex plane to determine a second relationship between the first and second complex valued calibration coefficients; and
    processing the first and second relationships to compute the first and second complex valued calibration coefficients.

6. The method according to claim 1, wherein:
    the causing the resistivity probe to make a plurality of uncalibrated impedance measurements comprises causing the resistivity probe to make a plurality uncalibrated impedance measurements at each of first and second measurement frequencies; and
    the processing the linear model further comprises processing the first and second complex valued calibration coefficients computed at the first frequency to determine corresponding first and second complex valued calibration coefficients at the second frequency.

7. The method according to claim 6, wherein the determining corresponding first and second complex valued calibration coefficients at the second frequency comprises correlating the first set of the uncalibrated impedance measurements made at the first frequency and the first set of the uncalibrated impedance measurements made at the second frequency with the following expression:

ZAPP_UNC_$F2$=$p_{21}$·ZAPP_UNC_$F1$+$q_{21}$ wherein ZAPP_UNC_F1 and ZAPP_UNC_F2 represent the uncalibrated impedance measurements made at the first and second frequencies F1 and F2, and $p_{21}$ and $q_{21}$ represent unknown complex valued coefficients.

8. The method according to claim 6, wherein the determining corresponding first and second complex valued calibration coefficients at the second frequency comprises correlating the calibrated impedance measurements obtained at the first frequency to calibrate the second set of impedance measurements made at the second frequency with the following expression:

$$\text{ZAPP\_CAL\_F2} = \text{ZAPP\_CAL\_F1} \times \frac{F(\omega 2)}{\omega 2} \times \frac{\omega 1}{F(\omega 1)}$$

wherein ZAPP_CAL_F1 represents the calibrated impedance measurements obtained at the first frequency F1, ZAPP_CAL_F2 represents corresponding calibrated impedance measurement at the second frequency F2, $\omega 1$ and $\omega 2$ represent radial frequencies respectively corresponding to the first and second frequencies F1 and F2, and $F(\omega)$ represents a dispersion function of the oil-based drilling fluid depending on radial frequency co.

9. The method according to claim 8, further comprising:
    modelling the dispersion function $F(\omega)$ at radial frequency $\omega$ according to a predetermined model and determining unknown parameters of the modelled dispersion function based on values $F(\omega 1)$ and $F(\omega 2)$ of the dispersion function at reference frequencies below a predetermined threshold.

10. The method according to claim 1, wherein the logging tool comprises a plurality of the sensors and wherein the calibration coefficients are determined separately for each one of the plurality of sensors.

11. The method according to claim 10, wherein the logging tool comprises a plurality of the sensors, wherein the calibration coefficients are determined separately for each of the plurality of the sensors, and wherein at least an unknown parameter of the dispersion function model is a statistical combination of the unknown parameter values obtained for each of the plurality of sensors.

12. An apparatus comprising:
a logging tool configured to be conveyed in a borehole, the logging tool including at least one resistivity sensor deployed in a tool collar, the resistivity sensor having a button electrode and being configured to make a plurality of uncalibrated impedance measurements at a plurality of frequencies and at a plurality of locations in the borehole while being conveyed in the borehole; and
at least one processor configured to:
 cause the at least one sensor to make first and second sets of the uncalibrated impedance measurements at corresponding first and second sets of locations in the borehole;
 identify the first set of uncalibrated measurements by fitting a linear model to the first set of uncalibrated measurements in a complex plane that plots an imaginary component of each of the first set of measurements with respect to a real component of each of the first set of measurements;
 process the linear model to compute first and second complex valued calibration coefficients;
 apply the first and second calibration coefficients to the second set of measurements to compute calibrated impedance measurements to account for effects of the resistivity sensor or the oil-based drilling fluid on the uncalibrated impedance measurements; and
 determine characteristics of a formation defining the borehole based on the calibrated impedance measurements.

13. The apparatus of claim 12, wherein the logging tool is a logging while drilling tool.

14. The apparatus of claim 12, wherein the logging tool comprises a plurality of the sensors and the at least one processor is configured to compute calibrated impedance measurements from the corresponding uncalibrated impedance measurements made by each of the sensors.

15. A method comprising:
conveying a logging tool in a borehole, the borehole including an oil-based drilling fluid, the logging tool including a resistivity sensor including a button electrode configured to make uncalibrated, complex valued impedance measurements;
causing the resistivity sensor to make a plurality of the uncalibrated, complex valued impedance measurements while the logging tool is conveyed in the borehole, the uncalibrated, complex valued impedance measurements including a first set of measurements made in a cased section of the borehole and a second set of measurements made in an open hole section of the borehole;
fitting the first set of measurements with a linear model in a complex plane, the complex plane plotting an imaginary component of each of the first set of measurements with respect to a real component of each of the first set of measurements;
processing the linear model to compute first and second complex valued calibration coefficients;
applying the first and second complex valued calibration coefficients to the second set of measurements to compute calibrated impedance measurements to account for effects of the resistivity sensor or the oil-based drilling fluid on the uncalibrated impedance measurements; and
determining characteristics of a formation defining the borehole based on the calibrated impedance measurements.

* * * * *